United States Patent
Zang et al.

(10) Patent No.: US 11,150,401 B2
(45) Date of Patent: Oct. 19, 2021

(54) DISPLAY PANEL, METHOD FOR FABRICATING THE SAME, AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Pengcheng Zang, Beijing (CN); Jing He, Beijing (CN)

(73) Assignees: Chengdu BOE Optoelectronics Technology Co., Ltd., Chengdu (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/699,914

(22) Filed: Dec. 2, 2019

(65) Prior Publication Data
US 2020/0218007 A1 Jul. 9, 2020

(30) Foreign Application Priority Data
Jan. 4, 2019 (CN) .......................... 201910009001.5

(51) Int. Cl.
F21V 8/00 (2006.01)
G06F 1/16 (2006.01)
G06F 1/18 (2006.01)

(52) U.S. Cl.
CPC ......... *G02B 6/0078* (2013.01); *G06F 1/1607* (2013.01); *G06F 1/1652* (2013.01); *G06F 1/189* (2013.01)

(58) Field of Classification Search
CPC ..... G02F 1/13336; G02F 2001/133331; G02F 1/133331; G02B 6/08; G02B 6/06; G09F 9/305
See application file for complete search history.

(56) References Cited

U.S. PATENT DOCUMENTS

| 8,212,742 B2 | 7/2012 | Chang et al. |
| 9,274,369 B1* | 3/2016 | Lee .................. G02F 1/133524 |
| 2002/0139985 A1 | 10/2002 | Matsuo et al. |
| 2004/0108806 A1* | 6/2004 | Cok .................... H01L 51/5281 |
| | | 313/504 |

(Continued)

FOREIGN PATENT DOCUMENTS

| CN | 1374822 A | 10/2002 |
| CN | 1445986 A | 10/2003 |

(Continued)

OTHER PUBLICATIONS

Office Action for corresponding Chinese Application No. 201910009001.5 dated Jun. 17, 2020.

*Primary Examiner* — Jessica M Merlin
(74) *Attorney, Agent, or Firm* — Arent Fox LLP; Michael Fainberg

(57) ABSTRACT

Disclosed are a display panel, a method therefor, and a display device The display device includes: an underlying substrate including a pixel area, a traveling line area; a pixel structure overlying the pixel area, the pixel structure includes pixel elements in matrix; a cover plate on the side of the pixel structure away from the underlying substrate, an orthographical projection of a display area on the cover plate onto the underlying substrate covers the pixel area and the traveling line area, the display area is uniformly divided into sub-display areas in same matrix as pixel elements; optic fiber beams between the pixel structure and the cover plate in one-to-one correspondence to the pixel elements, one end of optic fiber beams is in a light exit area of the pixel element corresponding thereto, the other end is in the sub-display area arranged at same position as the pixel element corresponding thereto.

15 Claims, 7 Drawing Sheets

(56) References Cited

U.S. PATENT DOCUMENTS

| | | |
|---|---|---|
| 2005/0006657 A1 | 1/2005 | Terashita |
| 2009/0309810 A1 | 12/2009 | Chang et al. |
| 2010/0159165 A1 | 6/2010 | Ueda et al. |
| 2011/0225799 A1 | 9/2011 | Shimoda et al. |
| 2012/0190220 A1* | 7/2012 | Lee .................... G02F 1/13452 439/67 |
| 2013/0278872 A1 | 10/2013 | Teller et al. |
| 2014/0218961 A1 | 8/2014 | Wu |
| 2017/0094815 A1 | 3/2017 | Chin et al. |
| 2018/0212096 A1 | 7/2018 | Liang et al. |
| 2018/0275449 A1 | 9/2018 | Wu et al. |
| 2019/0213923 A1 | 7/2019 | Meng et al. |

FOREIGN PATENT DOCUMENTS

| | | |
|---|---|---|
| CN | 101615658 A | 12/2009 |
| CN | 101916824 A | 12/2010 |
| CN | 102195008 A | 9/2011 |
| CN | 103969864 A | 8/2014 |
| CN | 103971599 A | 8/2014 |
| CN | 106229394 A | 12/2016 |
| CN | 106556890 A | 4/2017 |
| CN | 206194292 U | 5/2017 |
| CN | 107016935 A | 8/2017 |
| CN | 206671719 U | 11/2017 |
| CN | 107689428 A | 2/2018 |
| JP | 0561031 A | 3/1993 |
| JP | 0561033 A | 3/1993 |
| JP | 07198957 A | 8/1995 |
| JP | 2002341327 A | 11/2002 |
| JP | 4954547 B2 | 7/2007 |
| JP | 6397298 B2 | 9/2018 |
| KR | 100786842 B1 | 12/2007 |
| WO | 2005071471 A1 | 8/2005 |

\* cited by examiner

DISPLAY PANEL, METHOD FOR FABRICATING THE SAME, AND DISPLAY DEVICE

CROSS-REFERENCE TO RELATED APPLICATION

This application claims priority of Chinese Patent Application No. 201910009001.5, filed on Jan. 4, 2019, which is hereby incorporated by reference in its entirety.

FIELD

The present disclosure relates to the field of display devices, and particularly to a display panel, a method for fabricating the same, and a display device.

BACKGROUND

Generally a camera, an earphone, a fingerprint recognition component, etc., in the existing all-screen design are improved so that a screen to panel ratio is improved by sounding from a screen, recognizing a fingerprint on the screen, popping up the camera, etc.

SUMMARY

Some embodiments of the disclosure provide a display panel including:

an underlying substrate including a pixel area and a traveling line area;

a pixel structure overlying the pixel area, wherein the pixel structure includes a plurality of pixel elements arranged in a matrix;

a cover plate located on a side of the pixel structure away from the underlying substrate, wherein the cover plate includes a display area; an orthographical projection of the display area onto the underlying substrate covers the pixel area and the traveling line area, and the display area is uniformly divided into a plurality of sub-display areas arranged in a same matrix as the plurality of pixel elements; and a plurality of optic fiber beams arranged between the pixel structure and the cover plate in one-to-one correspondence to the pixel elements, wherein one end of the optic fiber beams is in a light exit area of the pixel element corresponding thereto, and the other end of the optic fiber beams is in the sub-display area arranged at a same position as the pixel element corresponding thereto.

In a possible implementation, at least one of the optic fiber beams includes at least one first optic fiber.

In a possible implementation, a diameter of the first optic fiber is less than 15 μm.

In a possible implementation, pixel driving units, and signal lines are arranged in the pixel area of the underlying substrate, the signal lines are electrically connected with the pixel driving units, and the pixel driving units are electrically connected with the pixel elements in the pixel structure through an anisotropic conductive adhesive.

In a possible implementation, peripheral traveling lines electrically connected with the signal lines, and solder pads electrically connected with the peripheral traveling lines are arranged in the traveling line area of the underlying substrate.

In a possible implementation, the pixel elements comprise first electrodes, second electrodes, and light emitting layers located between the first electrodes and the second electrodes.

In a possible implementation, the second electrodes are located on sides of the first electrodes away from the underlying substrate, and made of a material with a voltage-controllable reflectivity.

In a possible implementation, a material of the second electrodes is vanadium dioxide, tungsten oxide, nickel oxide, or electrically-conductive polyethylene.

In a possible implementation, the underlying substrate is a flexible underlying substrate or a rigid underlying substrate.

In a possible implementation, the pixel structure includes a plurality of column bases, external surfaces of the column bases are provided with the pixel elements arranged along an axial direction of the column bases; wherein, a quantity of the pixel elements on the column bases is identical to a quantity of the pixel driving units corresponding to the column bases; the column bases overlies the pixel area, and a side of the pixel elements, of the column bases is away from the underlying bases.

In a possible implementation, the column bases are second optic fibers.

Some embodiments of the disclosure further provide a method for fabricating a display panel, the method including:

forming an underlying substrate including a pixel area and a traveling line area;

forming a pixel structure overlying the pixel area of the underlying substrate, wherein the pixel structure includes a plurality of pixel elements arranged in a matrix;

forming a cover plate located on a side of the pixel structure away from the underlying substrate, wherein an orthographical projection of a display area on the cover plate onto the underlying substrate covers the pixel area and the traveling line area, and the display area is uniformly divided into a plurality of sub-display areas arranged in a same matrix as the plurality of pixel elements; and arranging a plurality of optic fiber beams between the pixel structure and the cover plate in one-to-one correspondence to the pixel elements, wherein one end of the optic fiber beams is in a light exit area of the pixel element corresponding thereto, and the other end of the optic fiber beams is in the sub display area arranged at a same position as the pixel element corresponding thereto.

In a possible implementation, the forming the underlying substrate includes forming pixel driving units, signal lines in the pixel area, wherein the signal lines are electrically connected with the pixel driving units, and the pixel driving units are electrically connected with the pixel elements through an anisotropic conductive adhesive.

In a possible implementation, the forming the underlying substrate further includes forming peripheral traveling lines electrically connected with the signal lines, and solder pads electrically connected with the peripheral traveling lines in the traveling line area.

In a possible implementation, the forming the pixel structure in the pixel area of the underlying substrate includes:

preparing a trans-print substrate, and forming a trans-print pattern including the plurality of pixel elements on the trans-print substrate;

trans-printing the trans-print pattern onto the external surfaces of a plurality of column bases; and covering the pixel area of the underlying substrate with the plurality of column bases, wherein the sides including the pixel elements, of the column bases are away from the underlying substrate.

In a possible implementation, the trans-printing the trans-print pattern onto external surfaces of a plurality of column bases includes: arranging a column of trans-print patterns in array on an external surface of respective column bases; wherein a quantity of pixel elements on the column bases is identical to a quantity of the pixel driving units corresponding to the column bases.

In a possible implementation, the column bases are second optic fibers.

Some embodiments of the disclosure further provide a display device including the display panel according to any one of the technical solutions above.

DETAILED DESCRIPTION OF THE EMBODIMENTS

The technical solutions according to the embodiments of the disclosure will be described below clearly and fully with reference to the drawings in the embodiments of the disclosure. Apparently the embodiments to be described are only a part but all of the embodiments of the disclosure. Based upon the embodiments here of the disclosure, all of other embodiments which can occur to those ordinarily skilled in the art without any inventive effort shall come into the claimed scope of the disclosure.

Figure 1:
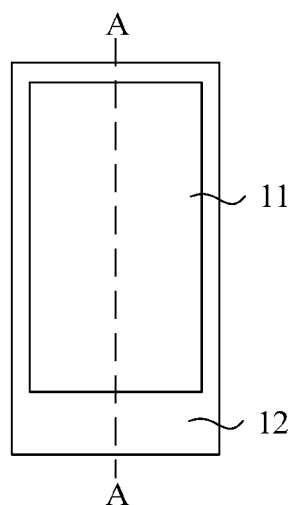
FIG. 1 is a schematic structural diagram of an underlying substrate according to some embodiments of the disclosure.
Figure 2:
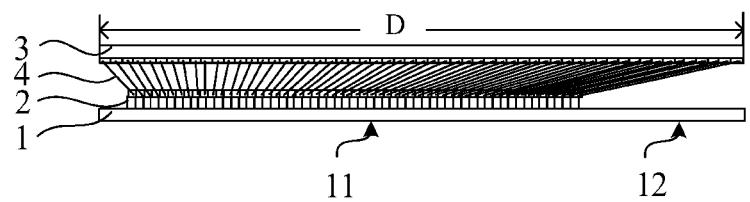
FIG. 2 is a schematic structural diagram of a display panel according to some embodiments of the disclosure.

As illustrated in FIG. 1 and FIG. 2, some embodiments of the disclosure provide a display panel including:

an underlying substrate 1 including a pixel area 11 and a traveling line area 12;

a pixel structure 2 overlying the pixel area 11, where the pixel structure 2 includes a plurality of pixel elements 21 arranged in a matrix;

a cover plate 3 located on the side of the pixel structure 2 away from the underlying substrate 1, where an orthographical projection of a display area on the cover plate 3 onto the underlying substrate 1 covers the pixel area 11 and the display area D of the traveling line area 12, and the display area D is uniformly divided into a plurality of sub-display areas arranged in the same matrix as the plurality of pixel elements 21; and a plurality of optic fiber beams 4 arranged between the pixel structure 2 and the cover plate 3 in one-to-one correspondence to the pixel elements 21, where each optic fiber beam 4 has one end located in a light exit area of the pixel element 21 corresponding thereto, and the other end located in the sub-display area arranged at the same position as the pixel element 21 corresponding thereto.

Figure 3:
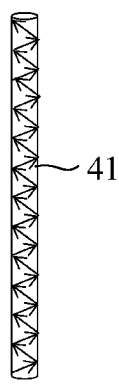
FIG. 3 is a schematic structural diagram of an optic fiber according to some embodiments of the disclosure.

The optic fiber stands for a light-guiding fiber, and is light conducting means operating under the total-reflection principle of light in a fiber made of glass or plastic. The optic fiber actually refers to a medium including a fiber core made of a transparent material, and a cladding around the fiber core, which is made of a material with a lower refractive index than that of the fiber core, where a light signal incident on the fiber core is reflected at the interface between the fiber core and the cladding so that the light signal is propagated in the core fiber. The optic fiber is generally a symmetric column structured as the fiber core, the cladding, and a coating at a plurality of media layers as illustrated in FIG. 3.

The display panel according to the embodiments of the disclosure includes the underlying substrate 1, the pixel structure 2, the cover plate 3, and the optic fiber beams 4, where the pixel area 11 and the traveling line area 12 are arranged on the underlying substrate 1, the pixel structure 2 overlies the pixel area 11 of the underlying substrate 1, the orthographical projection of the display area of the cover plate 3 onto the underlying substrate 1 covers the pixel area 11 and the display area D of the traveling line area 12, and light emitted by each pixel element 21 in the pixel structure 2 is conducted to the sub-display area corresponding thereto on the cover plate 3 along the optic fiber beam 4 corresponding thereto, so that the light emitted by the pixel structure 2 is uniformly distributed in the display area of the cover plate 3, and there is light transmitted above both the pixel area 11 and the traveling line area 12 of the underlying substrate 1, thus improving the screen to panel ratio and the valid light-emission area of the display panel so as to provide an all-screen design.

In the display panel, each optic fiber beam 4 includes at least one first optic fiber 41.

Optionally, the diameter of the first optic fiber 41 is less than 15 μm.

Figure 4:
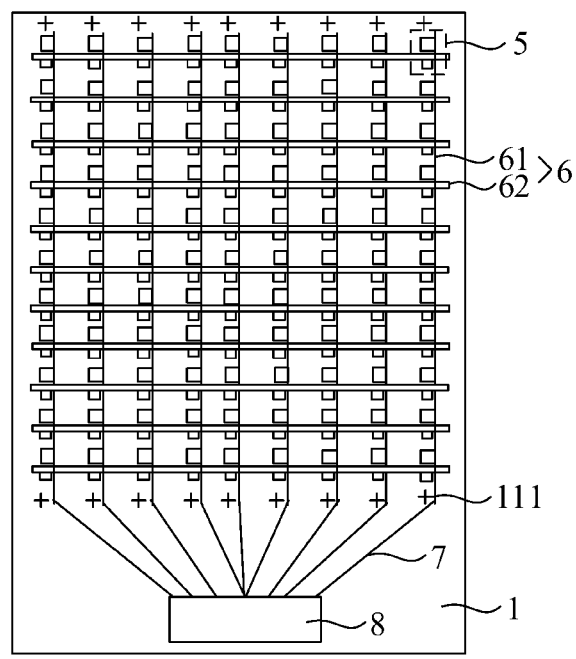
FIG. 4 is a schematic structural diagram of an underlying substrate according to some embodiments of the disclosure.
Figure 5:
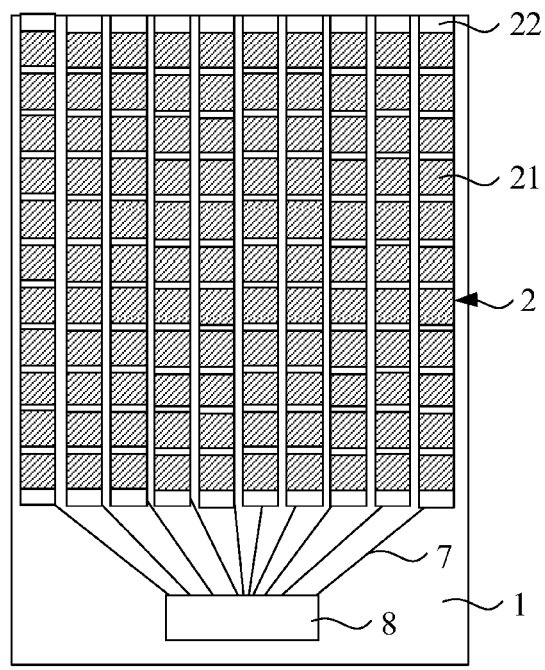
FIG. 5 is a schematic structural diagram of a pixel structure according to some embodiments of the disclosure.
Figure 15:
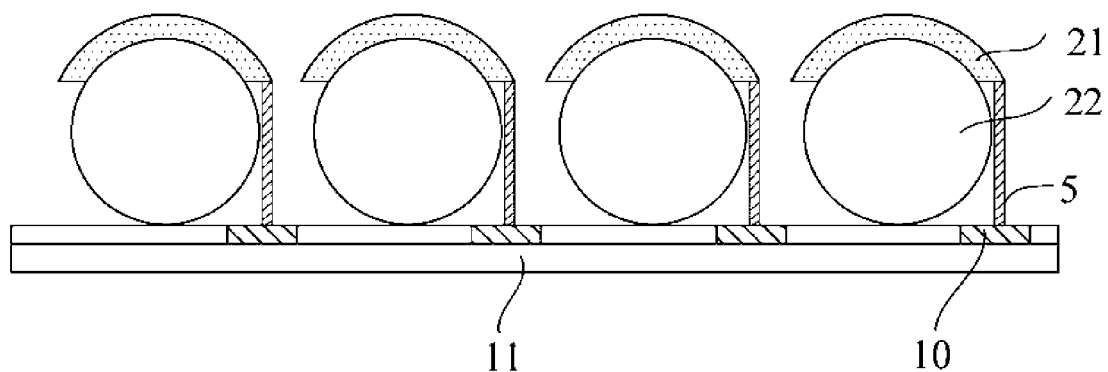
FIG. 15 is a schematic structural diagram of a pixel structure according to some embodiments of the disclosure.

In a possible implementation, as illustrated in FIG. 4 and FIG. 15, pixel driving units 5, signal lines 6 and other driving circuits, are arranged in the pixel area 11 of the underlying substrate 1, where the signal lines 6 are electrically connected with the pixel driving units 5, and the pixel driving units 5 are electrically connected with the pixel elements 21 in the pixel structure through the anisotropic conductive adhesive 10. In this embodiment, the pixel structure 2 overlies the pixel area 11 to thereby cover the driving circuits arranged in the pixel area 11, and as illustrated in FIG. 5, the pixel structure 2 shields the driving circuits which do not emit light, and through which no light is transmitted, so that the valid light-emission area of the display panel can be improved to thereby improve the PPI of a pixel.

Figure 14:
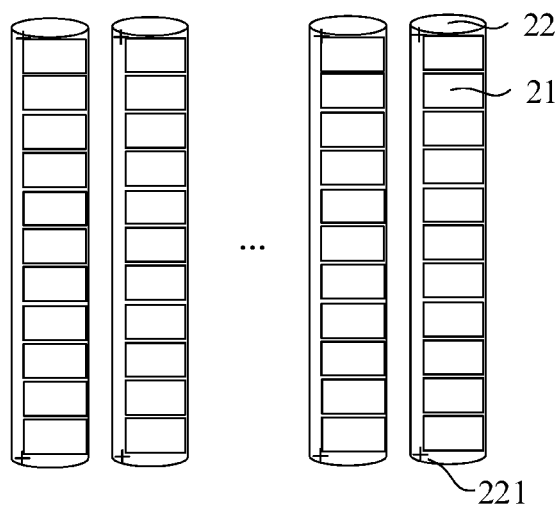

Optionally, the pixel structure 2 includes a plurality of column bases 22, as shown in FIG. 14, a column of pixel elements 21 is arranged on the external surface of each of the column bases 22 along the axial direction of the column bases 22. The quantity of pixel elements 21 on the column bases 22 is identical to the quantity of the pixel driving units 5 corresponding to the column bases 22. The column bases 22 overlies the pixel area 11 of the underlying substrate 1, and a side of the pixel elements, of the column bases 22 is away from the underlying bases 1. The anisotropic conductive adhesive is coated between the column bases 22 and the pixel driving units 5, as shown in FIG. 15.

Figure 6:
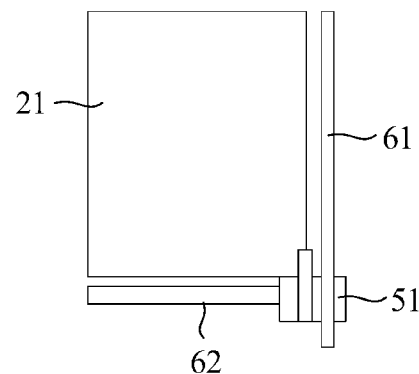
FIG. 6 is a schematic structural diagram of a pixel element according to some embodiments of the disclosure.

Optionally as illustrated in FIG. 6, the pixel driving units 5 can be Thin Film Transistor (TFT) switches 51, and the signal lines 6 include data lines 61 and scan lines 62.

In the display panel above, optionally peripheral traveling lines 7 electrically connected with the signal lines 6, and solder pads 8 electrically connected with the peripheral traveling lines 7 are arranged in the traveling line area 12 of the underlying substrate 1.

Figure 10:
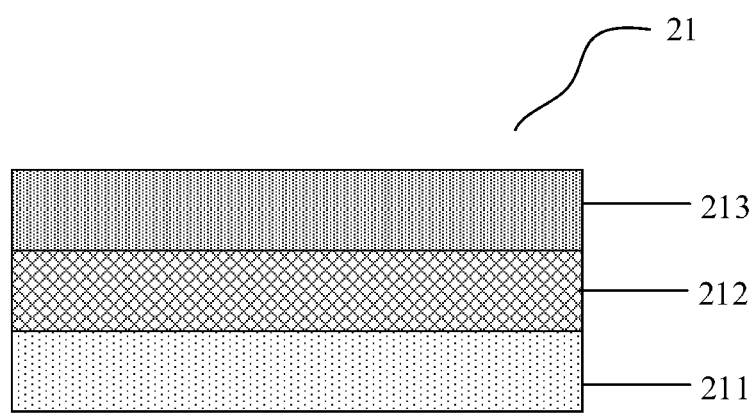
FIG. 10 is a schematic structural diagram of a pixel element according to some embodiments of the disclosure.

In the display panel above, in a possible implementation using the light-emitting principle to display, as illustrated in FIG. 10, the pixel elements 21 include first electrodes 211, second electrodes 213, and light emitting layers 212 located between the first electrodes 211 and the second electrodes 213 so that the pixel elements 21 can emit light. Optionally, the light emitting layers 212 are made of organic light emitting material or inorganic light emitting material. Optionally, the first electrodes 211 and the second electrodes 213 are made of ITO (Indium Tin Oxide).

Optionally, the pixel elements 21 can include red pixel elements, green pixel elements, and blue pixel elements.

In the display panel above, optionally, the second electrodes are located on the sides of the first electrodes away from the underlying substrate 1.

In some embodiments of displaying with the light-emitting principle, the light emitted by the light emitting layers 21 is conducted to the sub-display area corresponding thereto on the cover plate 3 along the optic fiber beam 4 corresponding thereto, so that the light emitted by the pixel structure 2 is uniformly distributed in the display area of the cover plate 3, and there is light transmitted above both the pixel area 11 and the traveling line area 12 of the underlying substrate 1, thus improving the screen to panel ratio and the valid light-emission area of the display panel so as to provide an all-screen design.

Figure 7:
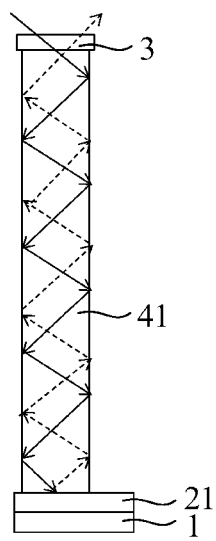
FIG. 7 is a conduction state diagram of an optic fiber according to some embodiments of the disclosure.

In some embodiments of displaying with reflection principle, there is no light emitting layer between the first electrodes and the second electrodes. The first electrodes and the second electrodes are directly in contact with each other. The second electrodes can be made of a material with a voltage-controllable reflectivity, light from the outside is incident on the cover plate 3, and reaches the second electrodes of the pixel elements 21 through the fiber beams 4, the reflectivity of the second electrodes for the light rays is varied under the control of voltage, and the light rays are reflected by the second electrodes into the optic fibers 4, and exit the cover plate 3, so that the valid light-emission area of the display panel can be improved, as illustrated in FIG. 7.

Optionally, the material of the second electrodes can be vanadium dioxide, tungsten oxide, nickel oxide, electrically-conductive polyethylene, etc.

Figure 8:
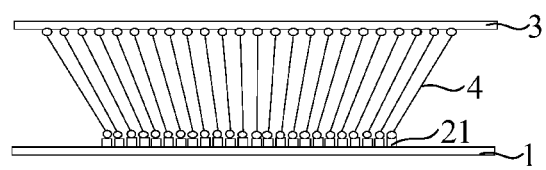
FIG. 8 is a schematic structural diagram of a rigid display panel according to some embodiments of the disclosure.
Figure 9:
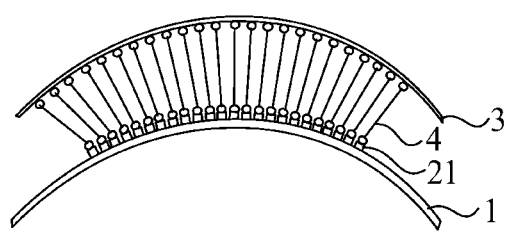
FIG. 9 is a schematic structural diagram of a flexible display panel according to some embodiments of the disclosure.

In the display panel above, the underlying substrate 1 can be a flexible underlying substrate 1, or can be a rigid underlying substrate 1, and since there is some flexibility of the optic fibers, an all-screen design can be provided for the rigid display panel or the flexible display panel, as illustrated in FIG. 8 and FIG. 9.

Figure 11:
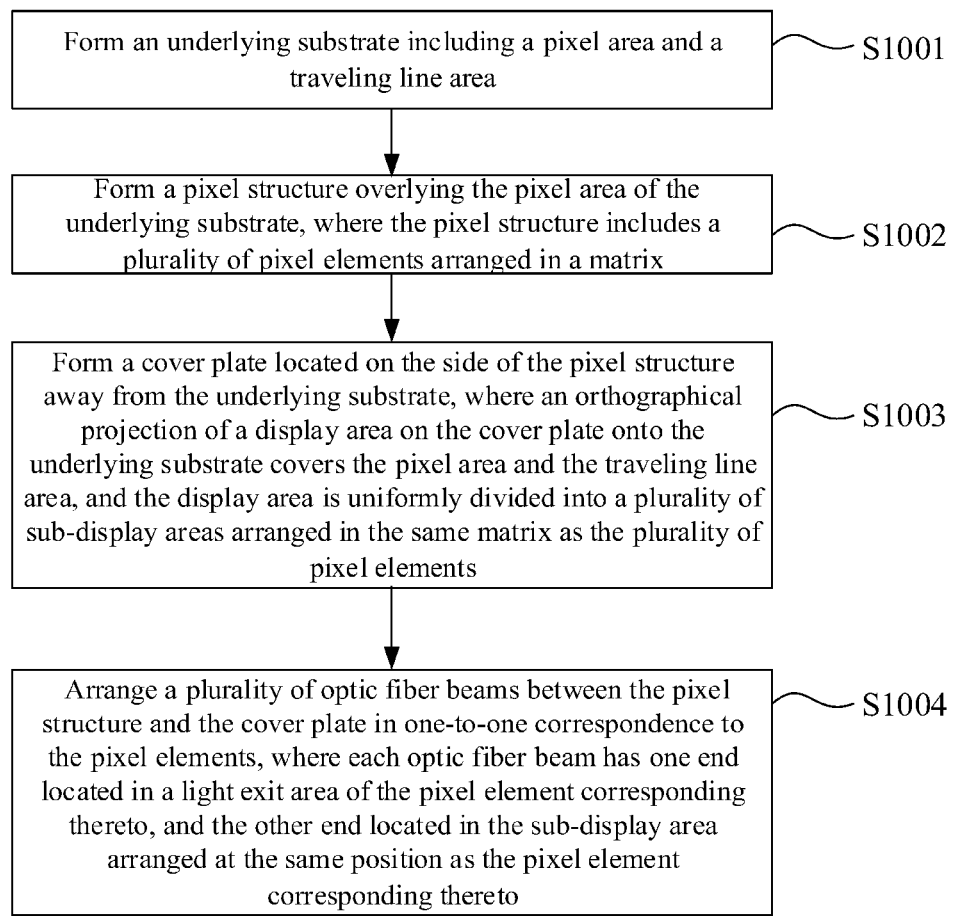
FIG. 11 is a flow chart of fabricating a display panel according to some embodiments of the disclosure.

Based upon the same inventive idea, as illustrated in FIG. 11, some embodiments of the disclosure further provide a method for fabricating a display panel, where the method includes the following steps:

the step S1001 is to form an underlying substrate including a pixel area and a traveling line area;

the step S1002 is to form a pixel structure overlying the pixel area of the underlying substrate, where the pixel structure includes a plurality of pixel elements arranged in a matrix;

the step S1003 is to form a cover plate located on the side of the pixel structure away from the underlying substrate, where an orthographical projection of a display area on the cover plate onto the underlying substrate covers the pixel area and the traveling line area, and the display area is uniformly divided into a plurality of sub-display areas arranged in the same matrix as the plurality of pixel elements; and the step S1004 is to arrange a plurality of optic fiber beams between the pixel structure and the cover plate in one-to-one correspondence to the pixel elements, where each optic fiber beam has one end located in a light exit area of the pixel element corresponding thereto, and the other end located in the sub-display area arranged at the same position as the pixel element corresponding thereto.

Optionally, the optically clear adhesive (OCA) is coated on the position corresponding to the pixel elements between the pixel elements and sub-display area, One end of the optic fiber beams is arranged on a position of OCA in the light exit area of the pixel elements. The OCA is coated on a surface of the sub-display area contacted with the optic fiber beam, and the other end of the optic fiber beams is arranged on a position of the OCA in the sub-display area, so that the optic fiber beams are fixed.

In the method above for fabricating a display panel, the underlying substrate, the pixel structure, the cover plate, and the optic fiber beams are formed successively, where the pixel area and the traveling line area are arranged on the underlying substrate, the pixel structure overlies the pixel area of the underlying substrate, the orthographical projection of the display area of the cover plate onto the underlying substrate covers the pixel area and the traveling line area, and light emitted by each pixel element in the pixel structure is conducted to the sub-display area corresponding thereto on the cover plate along the optic fiber beam corresponding thereto, so that the light emitted by the pixel structure is uniformly distributed in the display area of the cover plate, and there is light transmitted above both the pixel area and the traveling line area of the underlying substrate, thus improving the screen to panel ratio and the valid light-emission area of the display panel so as to provide an all-screen design.

Optionally, forming the underlying substrate includes forming pixel driving units, signal lines, where the signal lines are electrically connected with the pixel driving units, and the pixel driving units are electrically connected with the pixel elements through the anisotropic conductive adhesive, as illustrated in FIG. 15.

Optionally, forming the underlying substrate further includes forming peripheral traveling lines electrically connected with the signal lines, and solder pads electrically connected with the peripheral traveling lines in the traveling line area.

Figure 12:
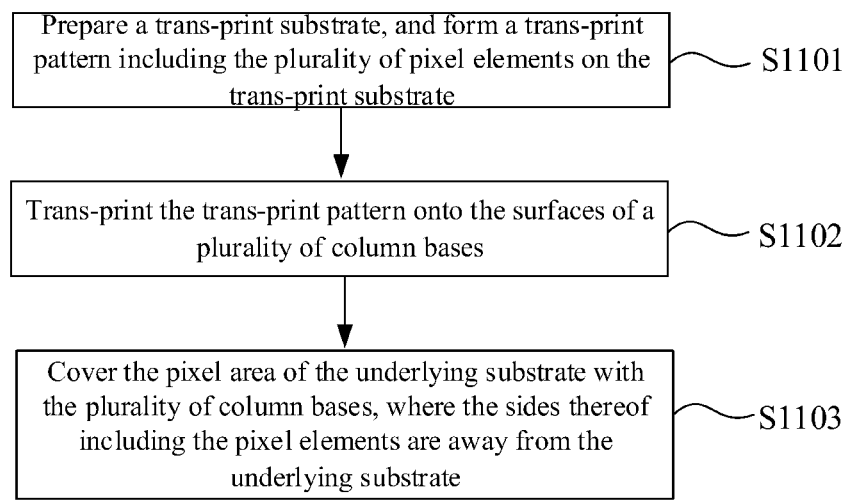
FIG. 12 is a flow chart of forming a pixel structure according to some embodiments of the disclosure.
Figure 13:
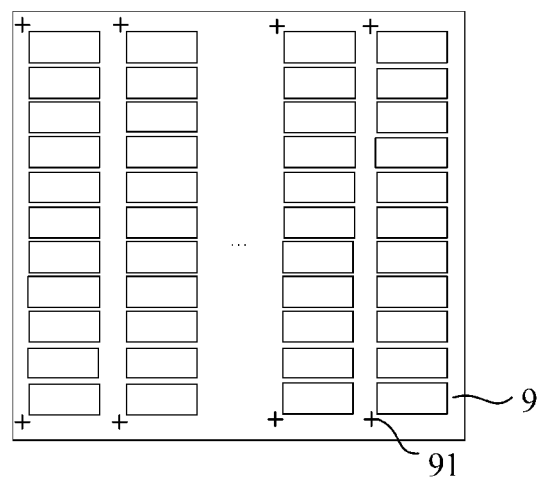
FIG. 13 and FIG. 14 are state diagrams of forming a pixel structure according to some embodiments of the disclosure.

Optionally, as illustrated in FIG. 12, forming the pixel structure in the pixel area of the underlying substrate includes the following steps:

the step S1101 is to prepare a trans-print substrate 9, and to form a trans-print pattern including the plurality of pixel elements on the trans-print substrate 9, as illustrated in FIG. 13;

the step S1102 is to trans-print the trans-print pattern onto the external surfaces of a plurality of column bases 22 as illustrated in FIG. 14, a column of trans-print patterns is arranged in array on the external surface of each column base 22. The quantity of pixel elements 21 on the column bases 22 is identical to the quantity of the pixel driving units 5 corresponding to the column bases 22; and the step S1103 is to cover the pixel area 11 of the underlying substrate 1 with the plurality of column bases 22, where the sides thereof including the pixel elements are away from the underlying substrate 1 as illustrated in FIG. 15.

In the fabricating method above, firstly the pattern of the pixel elements 21 is trans-printed onto the external surfaces of the column bases 22, and then the driving circuits of the underlying substrate are covered with the column bases 22 through coating the anisotropic conductive adhesive between the column bases 22 and the pixel driving units 5, so that the column bases 22 shield the driving circuits which do not emit light, and through which no light is transmitted, so the valid light-emission area of the display panel can be improved to thereby improve the PPI of a pixel; and the pixel driving units are electrically connected with the pixel elements through the anisotropic conductive adhesive to thereby drive the array of pixel elements to display.

Optionally, the column bases 22 can be second optic fibers.

In the method above for fabricating a pixel structure, alignment marks 91 are formed on the trans-print substrate 9, and alignment marks 221 are formed on the column bases, so that the alignment marks 91 are aligned with the alignment marks 221 for trans-printing. Furthermore alignment marks 111 are formed on the underlying substrate, and the alignment marks 91 are alignment with the alignment marks for installation while the pixel area 11 is being covered with the column bases onto which the pixel elements are trans-printed.

Some embodiments of the disclosure further provide a display device including the display panel according to any one of the technical solutions above.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A display panel, comprising:
   an underlying substrate comprising a pixel area and a traveling line area;
   a pixel structure overlying the pixel area, wherein the pixel structure comprises a plurality of pixel elements arranged in a matrix;
   a cover plate located on a side of the pixel structure away from the underlying substrate, wherein the cover plate comprises a display area; an orthographical projection of the display area onto the underlying substrate covers the pixel area and the traveling line area, and the display area is uniformly divided into a plurality of sub-display areas arranged in a same matrix as the plurality of pixel elements; and
   a plurality of optic fiber beams arranged between the pixel structure and the cover plate in one-to-one correspondence to the pixel elements, wherein one end of the optic fiber beams is in a light exit area of the pixel elements corresponding thereto, and the other end of the optic fiber beams is in the sub-display area arranged at a same position as the pixel elements corresponding thereto;
   wherein the pixel structure further comprises a plurality of column bases, the plurality of column bases cover the pixel area of the underlying substrate, an extension direction of the plurality of column bases is parallel to an extension plane of the underlying substrate, and the plurality of pixel elements are on a side of the plurality of column bases away from the underlying substrate;
   wherein the pixel elements comprise first electrodes, second electrodes, and light emitting layers located between the first electrodes and the second electrodes; wherein the second electrodes are located on sides of the first electrodes away from the underlying substrate, and made of a material with a voltage-controllable reflectivity.

2. The display panel according to claim 1, wherein at least one of the optic fiber beams comprises at least one first optic fiber.

3. The display panel according to claim 2, wherein a diameter of the first optic fiber is less than 15 μm.

4. The display panel according to claim 1, wherein pixel driving units, and signal lines are arranged in the pixel area of the underlying substrate, the signal lines are electrically connected with the pixel driving units, and the pixel driving units are electrically connected with the pixel elements in the pixel structure through an anisotropic conductive adhesive.

5. The display panel according to claim 4, wherein peripheral traveling lines electrically connected with the signal lines, and solder pads electrically connected with the peripheral traveling lines are arranged in the traveling line area of the underlying substrate.

6. The display panel according to claim 1, wherein a material of the second electrodes is vanadium dioxide, tungsten oxide, nickel oxide, or electrically-conductive polyethylene.

7. The display panel according to claim 1, wherein the underlying substrate is a flexible underlying substrate or a rigid underlying substrate.

8. The display panel according to claim 1, wherein external surfaces of the column bases are provided with the pixel elements arranged along an axial direction of the column bases, and a quantity of the pixel elements on the column bases is identical to a quantity of the pixel driving units corresponding to the column bases.

9. The display panel according to claim 8, wherein the column bases are second optic fibers.

10. A display device, comprising the display panel according to claim 1.

11. A method for fabricating a display panel, the method comprising:
    forming an underlying substrate comprising a pixel area and a traveling line area;
    forming a pixel structure overlying the pixel area of the underlying substrate, wherein the pixel structure comprises a plurality of pixel elements arranged in a matrix;
    forming a cover plate located on a side of the pixel structure away from the underlying substrate, wherein an orthographical projection of a display area on the cover plate onto the underlying substrate covers the pixel area and the traveling line area, and the display area is uniformly divided into a plurality of sub-display areas arranged in a same matrix as the plurality of pixel elements; and arranging a plurality of optic fiber beams between the pixel structure and the cover plate in one-to-one correspondence to the pixel elements, wherein one end of the optic fiber beams is in a light exit area of the pixel elements corresponding thereto, and the other end of the optic fiber beams is in the sub-display area arranged at a same position as the pixel elements corresponding thereto;

wherein the forming the pixel structure in the pixel area of the underlying substrate comprises:

preparing a trans-print substrate, and forming a trans-print pattern comprising the plurality of pixel elements on the trans-print substrate;

trans-printing the trans-print pattern onto external surfaces of a plurality of column bases; and covering the pixel area of the underlying substrate with the plurality of column bases, wherein sides comprising the pixel elements, of the column bases are away from the underlying substrate.

12. The method according to claim 11, wherein the forming the underlying substrate comprises forming pixel driving units, signal lines in the pixel area, wherein the signal lines are electrically connected with the pixel driving units, and the pixel driving units are electrically connected with the pixel elements through an anisotropic conductive adhesive.

13. The method according to claim 12, wherein the forming the underlying substrate further comprises forming peripheral traveling lines electrically connected with the signal lines, and solder pads electrically connected with the peripheral traveling lines in the traveling line area.

14. The method according to claim 11, wherein the trans-printing the trans-print pattern onto external surfaces of a plurality of column bases comprises: arranging a column of trans-print patterns in array on an external surface of respective column bases; wherein a quantity of pixel elements on the column bases is identical to a quantity of the pixel driving units corresponding to the column bases.

15. The method according to claim 11, wherein the column bases are second optic fibers.

* * * * *